United States Patent [19]

Boer

[11] 3,737,561

[45] June 5, 1973

[54] SIGNAL PROCESSING ARRANGEMENT FOR A COLOR TELEVISION CAMERA CIRCUIT

[75] Inventor: Dirk Boer, Emmasingel, Eindhoven, Netherlands

[73] Assignee: U.S. Philips Corporation, New York, N.Y.

[22] Filed: June 14, 1971

[21] Appl. No.: 152,522

[30] Foreign Application Priority Data

June 27, 1970 Netherlands ........................7009523

[52] U.S. Cl.......178/5.4 R, 178/5.4 HE, 178/5.4 AC

[51] Int. Cl.............................H04n 9/48, H04n 9/53

[58] Field of Search......................178/5.4 R, 5.4 AC, 178/5.4 HE

[56] References Cited

UNITED STATES PATENTS 2,888,514 5/1959 Pritchard ........................178/5.4 AC

FOREIGN PATENTS OR APPLICATIONS 1,473,134 2/1967 France ...........................178/5.4 AC

*Primary Examiner*—Robert L. Richardson
*Attorney*—Frank R. Trifari

[57] ABSTRACT

A signal handling arrangement for a color television camera circuit for avoiding discolorations in dark areas upon the display of a scene. Three gamma-corrected color signals R, G and B are applied to a minimum threshold level detection circuit, so that when they jointly exceed this level a control signal is provided to a color information attenuator which is formed in an adjustable manner.

8 Claims, 4 Drawing Figures

INVENTOR.
DIRK BOER

BY
[signature]
AGENT

DIRK BOER INVENTOR.

BY

AGENT

DIRK BOER INVENTOR.
BY
AGENT

SIGNAL PROCESSING ARRANGEMENT FOR A COLOR TELEVISION CAMERA CIRCUIT

The invention relates to a signal processing arrangement for a color television camera circuit formed with three terminals conveying different color signals and each forming part of a color channel, which terminals are connected to a coding circuit combining the color signals to a luminance signal and two color difference signals, which signal processing arrangement is provided with a minimum level detection circuit for the color signals, the detection circuit being connected for the purpose of control to a color information attenuator incorporated in the coding circuit.

Such a signal handling arrangement which ensures that upon the display of a scene having low light levels no discoloration occurs in those areas of the picture is known from the French Pat. Specification No. 1.473.134. A small faulty difference between the color signals which substantially always occurs by some cause or other in the color channels can be observed as a clearly noticeable discoloration in the dark areas of the picture. Such a discoloration especially becomes disturbingly manifest in moving parts in the scene in the areas of low light levels, namely as a discolored comet tail behind the moving part.

In the known signal processing arrangement a so-called combined color signal $\beta=(R+G+B)/(3)$ and three so-called modified color signals $R-\beta$, $G-\beta$ and $B-\beta$ are derived from the color signals red R, green G and blue B with the aid of matrix circuits. The combined color signal and the three modified color signals together are each applied to a further minimum level detection circuit. If the combined color signal is below a given minimum and if the largest of the three modified color signals is likewise below a different minimum level, a switch-off signal is provided through a coincidence gate to on-off switches, incorporated in the signal processing arrangement and being active as a color information attenuator. These switches are provided in so-called color difference channels with the signals R–Y and B–Y, in which Y is the luminance signal as a combination of the color signals. By switching off the switches it is achieved that upon the display of dark areas no color information which is either or not faulty is present so that these areas are displayed colorless. A level-dependent decoloration has been performed.

It is found that the known arrangement is formed in a rather complicated manner with two matrix circuits, two minimum level detection circuits, and a coincidence gate. In that case the color information attenuator performs an on-off switching operation of the color information.

According to the invention, a much simpler arrangement may be sufficient by suitable choice of the signals to be applied to the arrangement and by a different embodiment of the color information attenuator. To this end the signal processing arrangement according to the invention is characterized in that the terminals are coupled through clamping circuits for black level introduction to outputs of gamma correctors, while the color information attenuator is formed as a controllable signal attenuator.

By first applying gamma correction a clear indication is obtained that the minimum level has been exceeded and a control signal having a satisfactory edge steepness is generated for the controllable signal attenuator.

In order that the invention may be readily carried into effect, some embodiments thereof will now be described in detail, by way of example, with reference to the accompanying diagrammatic drawings, in which FIG. 1 shows in a block diagram a portion of a color television camera circuit in which the signal processing arrangement according to the invention is provided;

Figure 1:
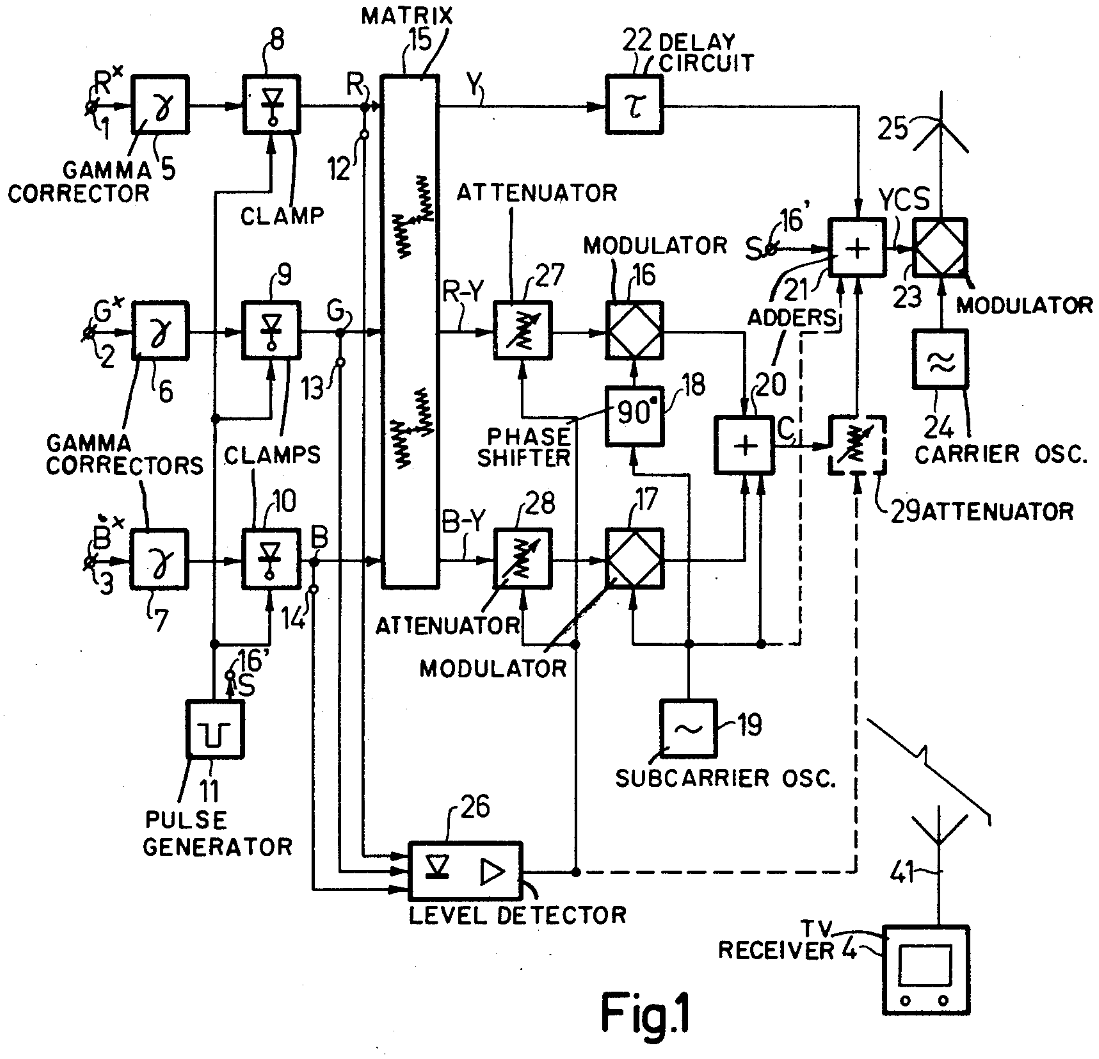

In FIG. 1 the reference numerals 1, 2 and 3 denote some terminals to which the signals $R^x$, $G^x$ and $B^x$, respectively, are applied. The signals $R^x$, $G^x$ and $B^x$ are considered to be provided by a color television camera not shown. The television camera may be formed with three camera tubes. The light coming from a scene to be picked up may be distributed through a beam splitter in red, green and blue light over the three camera tubes which thus generate a red $R^x$, green $G^x$ and blue $B^x$ color signal. An example of such a color signal is shown in FIG. 2 with a given signal waveform for the color signal $R^x$.

Figure 2:
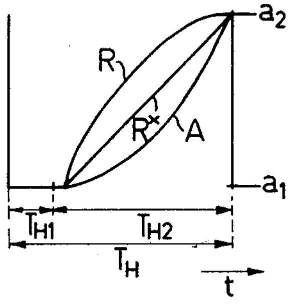
FIG. 2 is an example of a signal waveform occurring in the circuit of FIG. 1.

FIG. 2 shows a signal waveform during a period $T_H$. The period $T_H$ is the line period conventional for television in which line-by-line scanning in the camera tubes of the camera is effected. The line period $T_H$ is divided in a line blanking period $T_{H1}$ and a line scanning period $T_{H2}$. The signal waveform of the color signal $R^x$ shown corresponds to a scene in which the red light of a region of total absence (black level $a_1$) later on increases linearly to a maximum intensity (peak "white" level $a_2$).

FIG. 2 also shows a signal waveform of a color signal R and a curve A. Curve A is associated with a display apparatus 4 and relative to the black level $a_1$ it provides the light output on the display screen of the apparatus 4 when the color signal $R_x$ is applied thereto for the purpose of display in the signal waveform shown. It is found that without further steps the display apparatus 4 would not correctly display the scene with the color signal $R^x$ varying linearly because the light output would be obtained in accordance with an exponential variation according to curve A.

For correcting the difference between the linear pick-up characteristic illustrated by the signal waveform $R^x$ in FIG. 2 and the exponentially varying display characteristic according to curve A, the terminals 1, 2 and 3 are connected to gamma correctors 5, 6 and 7, respectively. These gamma correctors 5, 6 and 7 are followed by clamping circuits 8, 9 and 10 which receive clamping pulses from a pulse generator 11. The clamping circuits 8, 9 and 10 provide signals R, G and B to terminals 12, 13 and 14 and to a color matrix circuit 15.

The influence of the gamma correctors 5, 6 and 7 is found from a comparison of the signal waveforms of the color signals $R^x$ and R of FIG. 2. The result is that upon display by the display apparatus 4, a gamma-corrected signal R reproduces the scene correctly. In that case the black level $a_1$ is fixed in all three color signals R, G and B, because the pulse generator 11 provides clamping pulses before the end of the line blanking period $T_{H1}$ to the clamping circuits 8, 9 and 10. The pulse generator 11 is also considered to be able to provide synchronizing pulses which are denoted by the reference S at a terminal 16'.

The signal paths between the terminals 1 and 12, 2 and 13 and 3 and 14 may be denoted as color channels for the red, green and blue color signals, respectively.

The color matrix circuit 15 forms part of a coding circuit to be further described hereinafter which suitably composes the three color signals R, G and B for their transmission to the display apparatus 4. The matrix circuit 15 composes the color signals, R, G and B to a so-called luminance signal Y in which, for example, $Y = 0.3\ R + 0.6\ G + 0.1\ B$ and to color difference signals R – Y and B – Y. Normally the color difference signals are directly applied to modulators 16 and 17, respectively. Modulator 16 is connected through a phase shifter 18 of 90° and modulator 17 is directly connected to an oscillator 19 which provides a subcarrier. The phase shifter 18 of 90° may be replaced by two phase shifters of 45° which may be placed between the oscillator 19 and the modulators 16 and 17. The color difference signals R–Y and B–Y modulate the subcarrier of the oscillator 19 in a phase shift of 90° so that the modulators 17 and 16 together produce a quadrature-modulated signal C through an adder 20. The signal C is generally indicated as the chrominance signal. Normally the chrominance signal C is applied directly to an adder 21 to other inputs of which the terminal 16' conveying the synchronizing signal S and a delay circuit 22 may be connected through which delay circuit the matrix circuit 15 provides the luminance signal Y. The delay circuit 22 compensates, in the luminance channel with the signal Y, the time delay which occurs in both color difference channels including modulators 16 and 17.

The adder 21 provides a video signal YCS which is built up of the luminance and color information of the scene and the scanning synchronizing information for the television system. An input of the adder 20 or 21 may be connected to the subcarrier oscillator 19 in order to ensure a burst of for example 10 subcarrier periods for burst purposes in the signal C from the adder 20 or directly in the signal YCS from the adder 21.

The video signal YCS from the adder 21 is applied to a modulator 23 to which also a carrier from a carrier oscillator 24 is applied. The modulator 23 consequently provides a television signal to a transmitter aerial 25 for the transmission of the television signal to a receiver aerial 41 of the display apparatus 4.

The components 15 to 24 together constitute a coding circuit so as to form a television signal which is suitable for transmission from the color signals R, G and B. Such a coding circuit (15–24) is generally used and generally ensures a satisfactory display of the scene on the display apparatus 4. In practice it is, however, found that always small faulty differences between the color signals R, G and B and the color difference signals R–Y and B–Y occur in the color channels and color difference channels, which differences become disturbingly manifest by a discoloration of the dark area upon display for low values of the luminance signal Y, that is to say, for dark areas in the scene. Due to the gamma correction performed at which the color signals in the dark areas (near the black level $a_1$ of FIG. 2) have a larger amplification these faulty differences even become more manifest in the signals. Color smears or comet tails which are caused by inertia phenomena in the camera tubes appear upon display behind moving, luminous parts in dark areas of the scene. Such a color smear becomes particularly manifest.

For correcting the described discoloration of dark areas in a reproduction of the scene, the signal processing arrangement is provided with a minimum level detection circuit 26, three inputs of which are connected, according to the invention, to the terminals 12, 13 and 14, and a single output of which is connected for control purposes to two signal attenuators 27 and 28, incorporated in the color difference channels between the matrix circuit 15 and the modulators 16 and 17. The minimum level detection circuit 26 provides a control signal if all three color signals R, G and B at the terminals 12, 13 and 14 exceed a value denoted as the minimum level. The control signal then generated by the circuit 26 attenuates the color difference signals R–Y and B–Y and hence the chrominance signal C through the controllable signal attenuators 27 and 28, so that in case of display of the video signal YCS on the display apparatus 4 the color information in the dark areas is reduced. A troublesome discoloration of the dark areas upon display on the display apparatus 4 is prevented thereby. The luminance signal Y is then not influenced so that the dark area is displayed at the correct luminosity.

For obtaining a very clear indication that all three color signals exceed the minimum level it is essential to place the detection circuit 26 in the camera circuit after the gamma correctors 5, 6 and 7. For this purpose use is made of the level-dependent amplification performed by the gamma correctors 5, 6 and 7, which amplification is large for low signal values as has been described with reference to FIG. 2 for the color signals $R^\gamma$ and R.

Due to the black level fixation performed a variation in the black level with a resultant color distortion is obviated and noise in the low signal levels which is different due to the difference in noise character of the channels does not become manifest as colored noise upon display.

Since it is unwanted that the signal attenuation exerts influence on the burst provided by the subcarrier oscillator 19 for burst purposes, the signal attenuators 27 and 28 are placed before the adder 20 if this is connected to the oscillator 19 for adding the burst. However, if the burst is added in the adder 21, as is shown by the broken line, one signal attenuator 29 may suffice which is arranged between the adders 20 and 21.

Figure 3:
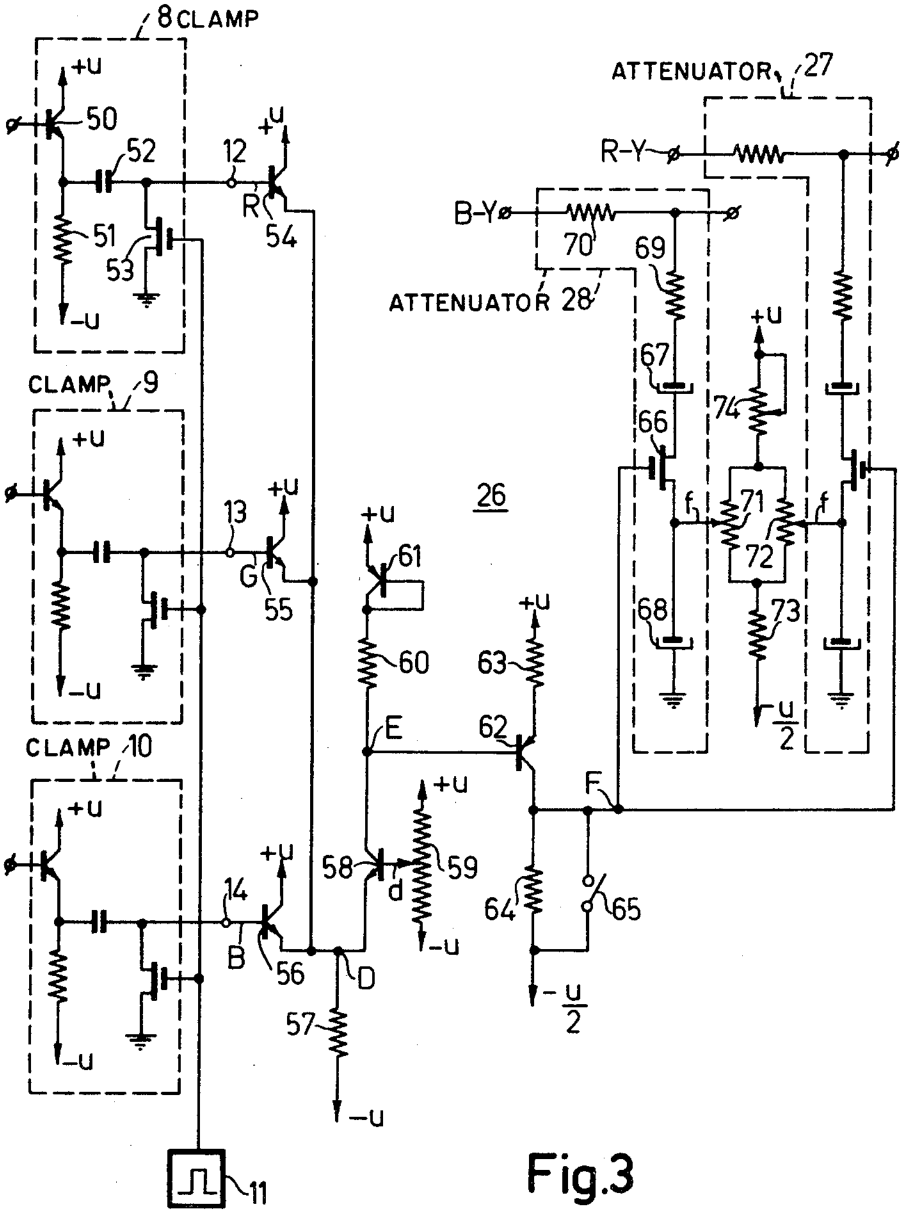
FIG. 3 shows the signal processing arrangement according to the invention and a few other parts in detail of the circuit shown in FIG. 1.

FIG. 3 shows a few components of the signal processing arrangement of FIG. 1 is greater detail, namely the clamping circuits 8, 9 and 10 which are controlled by the pulse generator 11, the signal attenuators 27 and 28 and the minimum level detection circuit 26.

The clamping circuits 8, 9 and 10 are formed identically so that only one of them, namely the circuit 8, will be described in greater detail. The clamping circuit 8 is formed with an npn-transistor 50 arranged as an emitter follower whose collector electrode is connected to a terminal +U and whose emitter electrode is connected through a resistor 51 to a terminal –U. The terminals +U and –U form part of voltage sources not shown. The emitter electrode of transistor 50 is connected through a capacitor 52 to the source electrode of a field effect transistor 52 having an isolated gate electrode, and whose drain electrode is connected to ground. Clamping pulses occurring before the end of the line blanking period ($T_{H1}$ of FIG. 2) are applied to the gate electrode of the transistor 53 by pulse generator 11 so that this transistor becomes conducting and is active as a switch. The result is that due to a gamma corrected color signal being applied to the base electrode of transistor 50, the terminal 12 which is connected to the junction of capacitor 52 and transistor 53 conveys a color signal R in which the black level $a_1$ of FIG. 2 is fixed. In this manner the terminals 12, 13 and 14 connected to the clamping circuits 8, 9 and 10 convey gamma-corrected color signals R, G and B having a fixed black level.

Figure 4:
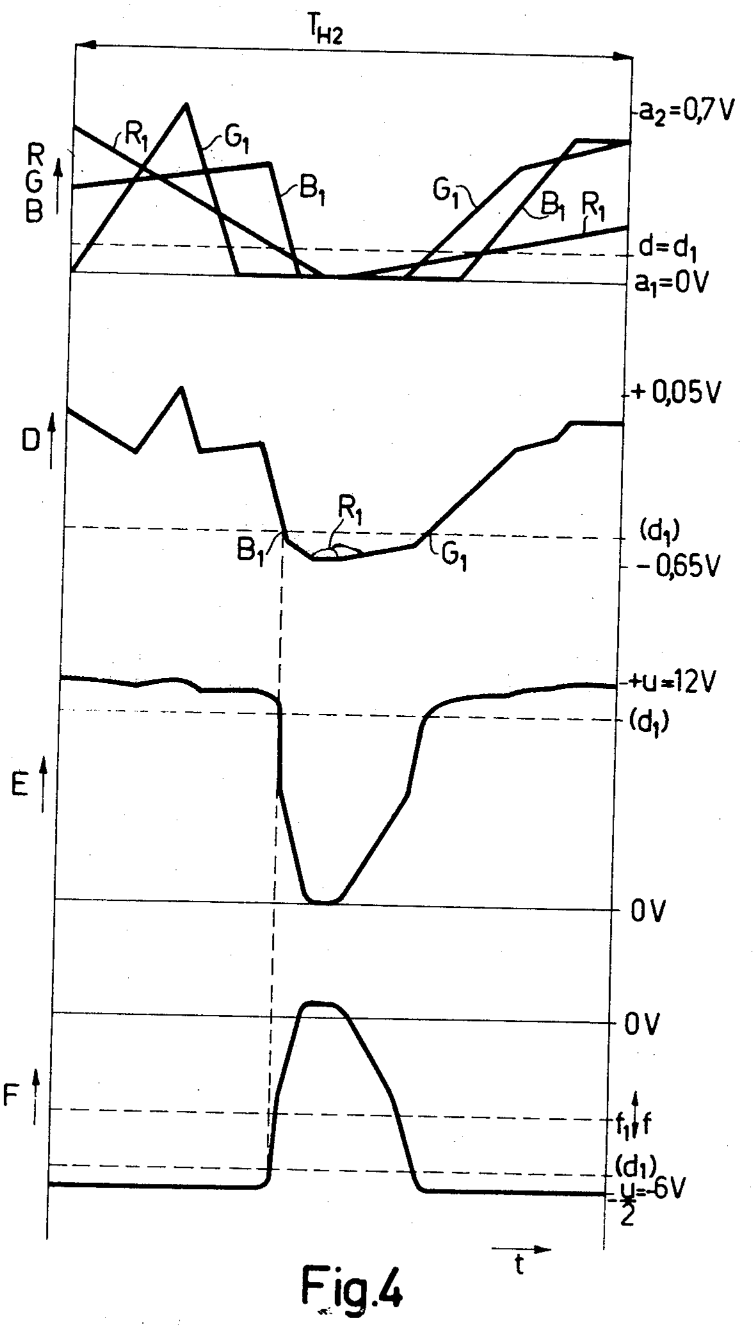
FIG. 4 shows examples of several signal waveforms occurring in the signal processing arrangement of FIG. 3 according to the invention.

For the purpose of clarification of the operation of the circuit of FIG. 3, FIG. 4 shows a few signal waveforms during the line scan period $T_{H2}$. The signals and levels shown in FIG. 4 have the same reference numerals in FIG. 3. A few signal waveforms $R_1$, $G_1$ and $B_1$ have been chosen arbitrarily for the color signals R, G and B. It is indicated for the purpose of illustration that the black level $a_1$=0 V and the peak "white" level $a_2$ = 0.7 V.

The terminals 12,13 and 14 are each connected to the base electrode of an npn-transistor 54, 55 or 56 whose collector electrodes are connected to terminals +U. The interconnected emitter electrodes of the transistors 54, 55 and 56 are connected through a resistor 57 to the terminal −U. The junction having the reference D of the resistor 57 and the transistors 54, 55 and 56 which are active as emitter followers conveys a voltage which is plotted as signal D in FIG. 4. The color signal R, G or B having the highest value determines the instantaneous value of the signal D taking into account a voltage drop having a value of 0.65 V across the base, emitter junction of the transistors 54, 55 and 56.

The junction with the signal D in FIG. 3 is connected to the emitter electrode of an npn-transistor 58 whose base electrode is connected to a tap on a potentiometer 59 arranged between terminals +U and −U while the collector electrode is connected to the terminal +U through a resistor 60 and a transistor 61 arranged as a diode. The reference *d* is denoted near the tap on potentiometer 59 which in FIG. 4 is plotted as a controllable voltage level, namely at a level $d = d_1$. If in the signal D the voltage drops below the level ($d_1$), the transistor 58 becomes intensively conducting so that the collector electrode conveys a voltage indicated as signal E and provides it to the base electrode of a pnp-transistor 62. The emitter electrode of transistor 62 is connected through a resistor 63 to the terminal +U and the collector electrode is connected through a parallel arrangement of a resistor 64 and an off-switch 65 to a terminal −U/2. In case of an open switch 65, the collector electrode of transistor 62 conveys a voltage under the control of signal E which voltage is further shown as signal F in FIG. 4. In the closed condition of switch 65, the collector electrode of transistor 62 is connected directly to terminal −U/2 and it will be found that then the signal processing arrangement according to the invention (26, 27, 28) is rendered inoperative.

In FIG. 4, a value of 12 V has been given as an example for the voltage U. The transistor 61 arranged as a diode is of the same type as the transistor 62 and serves for compensating the temperature influence on the base emitter junction in the transistor 62. The transistor 62 is active as an amplifier and inverter stage (62, 63, 64).

The collector electrode of transistor 62 is connected to both signal attenuators 27 and 28 which are formed identically. The signal attenuator 28 to be further described is provided with a field effect transistor 66 having an isolated gate electrode to which the collector electrode of transistor 62 is connected. The source electrode and the drain electrode of transistor 66 are each connected to an electrolytic capacitor 67 or 68. Capacitor 68 provides a coupling to ground while capacitor 67 is arranged in series with two resistors 69 and 70. The color difference signal B–Y is applied to the free end of resistor 70 while the junction of resistors 69 and 70 provides the output for the signal attenuator 28.

For obtaining an adjustable threshold above which the signal attenuator 28 and hence 27 becomes operative, the junction of transistor 66 and capacitor 68 is connected to a tap on a potentiometer 71 which in a parallel arrangement with a potentiometer 72 (used for the attenuator 27) is arranged in series with a resistor 73 to the terminal −U/2 and with a potentiometer 74 arranged as an adjustable resistor to the terminal +U. The reference *f* indicates a level at the taps on the potentiometers 71 and 72 which level is plotted in FIG. 4 near the signal F and has a value $f_1$ and which is adjustable with the aid of potentiometers 71, 72 and 74. The potentiometers 71 and 72 mainly serve for compensating spreads between the components used (66–70, particularly 66) in the attenuators 27 and 28 while the potentiometer 74 mainly provides this adjustment.

When level *f1* is exceeded by signal F, transistor 66 becomes conducting and behaves as a controlled resistor whose value, starting from infinitely high in the cut-off condition, is determined by the voltage impressed on the gate electrode. The signal attenuators 28 and 27 are thus formed as a controlled potential divider so that the color difference signals B–Y and R–Y are passed on unattenuated in the case of a cut-off transistor 66 to the loads following the attenuators 28 and 27 and are passed on attenuated when transistor 66 is active as a controlled resistor.

The collector electrode of transistor 62 constitutes the control output of the minimum level detection circuit 26 which conveys the control signal F as a control voltage.

The control range within which the minimum level detection circuit 26 including components 54–64 and 71–74 may be active is determined by the level $d = d_1$ in FIG. 4. This level $d_1$ may be adjusted, for example, as shown in FIG. 4 at 15 percent of the peak level $a_2$. The resistors 57 and/or 60 and the potentiometer 59 are then proportioned in such a manner that for a black level value in the signal D the collector electrode of transistor 58 is also brought to black level = ground potential while that of transistor 62 is located slightly above this level. Subsequently a choice may be made between o and 15 percent by means of potentiometer 74 within this control range of 15 percent (with level ($d_1$) in signals D, E and F). For an adjusted small resistance of potentiometer 74, the level *f* lies above the maximum value shown in signal F of FIG. 4 so that the signal attenuators 28 and 27 cannot become active at all (0 percent limit). For a larger resistance of potentiometer 74, the level *f* will be lower so that the attenuators 28 and 27 can become active while adjustment is approximately possible until the adjustable level *f* reaches the value ($d_1$) (15 percent limit). It will be evident that a switching on of the switch 65 prevents the operation of the signal attenuators 28 and 27.

It is considered to be essential that the minimum level detection circuit 26 directly receives all three color signals R, G and B so that it can be determined that all three signals are below the minimum level. It is incorrect to apply, for example, the luminance signal Y to the circuit 26. Starting from the formula $Y = 0.3\ R + 0.6\ G + 0.1\ B$, the luminance signal Y may be below level $d_1$ while signal B is above this level for $R \approx O$ and $G \approx O$ and $B > 0$ in which $Y \approx 0.1$ B. As a result a dark, blue-colored region in the reproduction of the scene which corresponds to the scene in a perfectly correct manner would be decolored in a faulty manner. Due to the choice that all three color signals R, G and B must be below the minimum level without a certain ratio such as in the luminance signal Y being introduced, a faulty decoloration will then occur.

It will be evident that the decoloration obtained for the dark areas in the reproduction of the scene does not exert influence on the luminosity so that the contrasts in the reproduction are maintained correctly.

What is claimed is:

1. A circuit comprising a plurality of input means for receiving respective color signals; a plurality of means for gamma correction coupled to said input means respectively; a plurality of means for clamping coupled to said gamma correction means respectively; means coupled to said clamping means for forming a luminance and color difference signals; and means for eliminating faulty hues in displayed areas having both low color saturation and low luminance, said eliminating means comprising means coupled to all of said clamping means for producing a control signal when the sum of all of said color signals goes below a selected value and at least one means coupled to said forming means to receive said color difference signals for attenuating the amplitudes of all of said color difference signals in accordance with the value of said control signal.

2. A circuit as claimed in claim 1 wherein said attenuating means comprises a series circuit including a resistor, at least one capacitor, and an insulated gate field effect transistor, and means for biasing said transistor.

3. A circuit as claimed in claim 1 wherein said producing means comprises a plurality of emitter follower circuits coupled to said clamping means respectively, a common load impedance coupled to said emitter followers, a first transistor coupled to said load, means for biasing said transistor, and an inverting amplifier means for providing said control signal comprising a second transistor coupled to said first transistor.

4. A circuit as claimed in claim 1 wherein said color signals, said input means said gamma correction means, and said clamping means are all three in number, and said color difference signals are two in number.

5. A circuit as claimed in claim 4 wherein said color signals comprise, red, green, and blue color signals respectively, and said color difference signals comprise red and blue color difference signals respectively.

6. A circuit as claimed in claim 1 wherein said color difference signals are two in number and further comprising a pair of modulators coupled to said forming means to receive said color difference signals respectively, a subcarrier oscillator coupled to one of said modulators, a phase shifter coupled between said remaining modulator and said oscillator, and means for adding the outputs of said modulators to form a resultant chrominance signal.

7. A circuit as claimed in claim 6 wherein said attenuating means is coupled to the output of said adder.

8. A circuit as claimed in claim 6 wherein said attenuating means comprises two attenuators each having an input coupled to said forming means to receive one of said color difference signals respectively and an output coupled to one of said modulators respectively.

* * * * *